United States Patent
Loeffler et al.

(10) Patent No.: US 10,479,338 B2
(45) Date of Patent: Nov. 19, 2019

(54) HYDRAULIC UNIT FOR A SLIP CONTROLLER OF A HYDRAULIC VEHICLE BRAKE SYSTEM

(71) Applicant: Robert Bosch GmbH, Stuttgart (DE)

(72) Inventors: Michael Loeffler, Oberstaufen (DE); Thomas Zander, Langenargen (DE); Michael Schlitzkus, Dietmannsried (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/697,907

(22) Filed: Sep. 7, 2017

(65) Prior Publication Data

US 2018/0065612 A1    Mar. 8, 2018

(30) Foreign Application Priority Data

Sep. 7, 2016  (DE) .................... 10 2016 216 968

(51) Int. Cl.
| | | |
|---|---|---|
| *B60T 17/04* | (2006.01) | |
| *B60T 8/36* | (2006.01) | |
| *B60T 8/48* | (2006.01) | |
| *B60T 8/52* | (2006.01) | |

(52) U.S. Cl.
CPC .............. *B60T 17/04* (2013.01); *B60T 8/368* (2013.01); *B60T 8/4827* (2013.01); *B60T 8/52* (2013.01)

(58) Field of Classification Search
CPC .................................. B60T 8/368; B60T 17/04
See application file for complete search history.

(56) References Cited

U.S. PATENT DOCUMENTS

| | | | | | |
|---|---|---|---|---|---|
| 4,354,715 | A | * | 10/1982 | Farr | B60T 8/368 303/10 |
| 4,568,131 | A | * | 2/1986 | Blomberg | B60T 8/34 188/352 |
| 5,529,389 | A | * | 6/1996 | Sekiguchi | B60T 8/368 137/884 |
| 5,695,259 | A | * | 12/1997 | Isshiki | B60R 16/0239 303/119.2 |
| 5,967,625 | A | * | 10/1999 | Reuter | B60T 8/348 303/116.1 |
| 6,215,672 | B1 | * | 4/2001 | Warner | B60T 8/171 361/785 |

(Continued)

FOREIGN PATENT DOCUMENTS

DE    10 2006 059 924 A1    6/2008

*Primary Examiner* — Bradley T King
(74) *Attorney, Agent, or Firm* — Maginot, Moore & Beck LLP

(57) ABSTRACT

A hydraulic unit for a slip controller of a hydraulic vehicle brake system includes an electric motor, a plurality of hydraulic pumps, a hydraulic block, a plurality of solenoid valves, a rotation angle sensor, an electronic control unit, and a valve cover. The electric motor is positioned on a narrow side of the hydraulic block, and is configured to drive the hydraulic pumps. The electronic control unit includes a contacting mechanism, and is positioned in the valve cover. The electric motor and the solenoid valves are arranged so that the electric motor and electromagnets of the solenoid valves protrude to approximately a same extent from the hydraulic block to enable simple commutation with the rotation angle sensor and the contacting mechanism of the electronic control unit.

8 Claims, 1 Drawing Sheet

(56) References Cited

U.S. PATENT DOCUMENTS

| | | | | |
|---|---|---|---|---|
| 6,241,489 B1* | 6/2001 | Lewin | ............... | B60T 8/368 |
| | | | | 417/410.1 |
| 6,545,613 B1* | 4/2003 | Homback | ............. | B60T 8/00 |
| | | | | 340/870.14 |
| 6,634,723 B1* | 10/2003 | Ganzel | ............... | B60T 8/368 |
| | | | | 303/119.3 |
| 2001/0030461 A1* | 10/2001 | Anderson | ............ | B60T 8/368 |
| | | | | 303/3 |
| 2004/0075339 A1* | 4/2004 | Volz | ............... | B60T 8/368 |
| | | | | 303/116.4 |
| 2004/0113488 A1* | 6/2004 | Sekihara | ............ | B60T 8/368 |
| | | | | 303/119.3 |
| 2006/0108884 A1* | 5/2006 | Shiino | ............... | B60T 8/267 |
| | | | | 310/89 |
| 2009/0189440 A1* | 7/2009 | Abe | ............... | B60T 8/321 |
| | | | | 303/114.1 |
| 2012/0070324 A1* | 3/2012 | Haecker | ............ | H02K 1/187 |
| | | | | 417/415 |
| 2015/0246663 A1* | 9/2015 | Sagayama | ............ | B60T 8/368 |
| | | | | 303/10 |
| 2016/0107627 A1* | 4/2016 | Lutz | ............... | B60T 8/368 |
| | | | | 303/20 |
| 2018/0170334 A1* | 6/2018 | Loeffler | ............ | B60T 8/368 |

\* cited by examiner

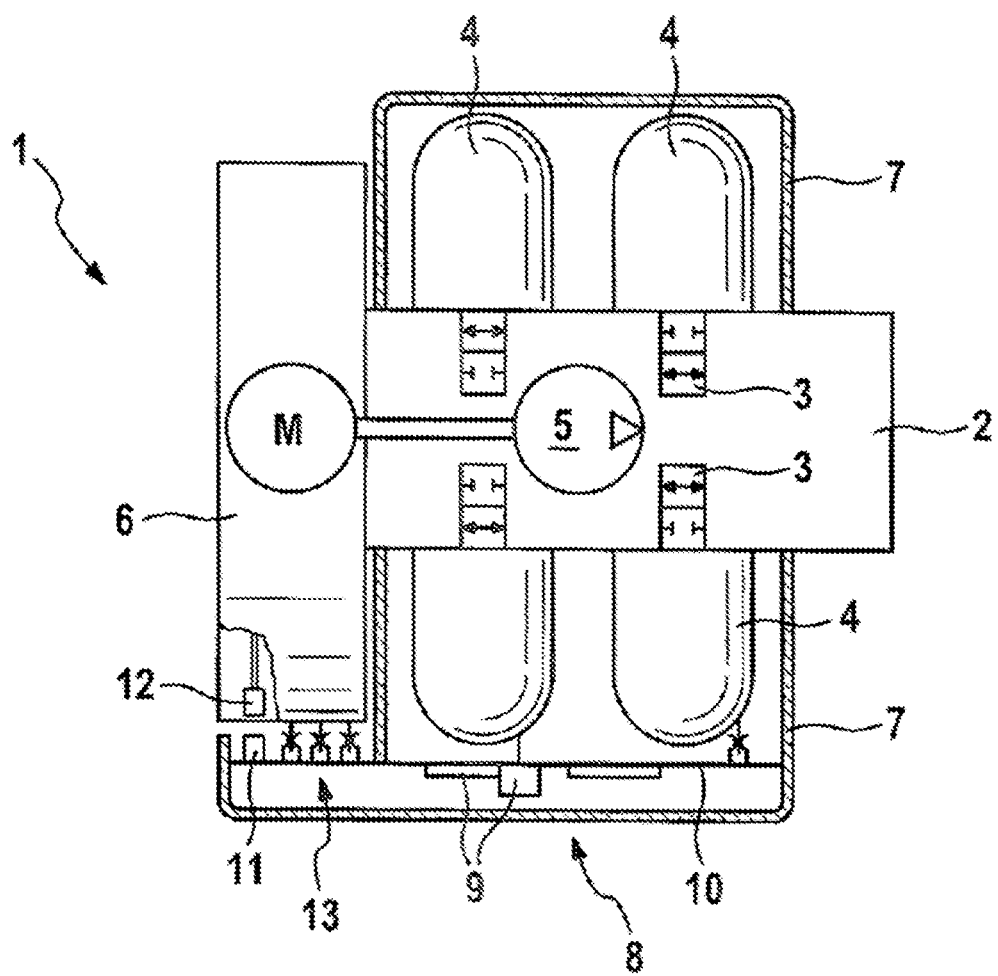

HYDRAULIC UNIT FOR A SLIP CONTROLLER OF A HYDRAULIC VEHICLE BRAKE SYSTEM

This application claims priority under 35 U.S.C. § 119 to patent application no. DE 10 2016 216 968.8, filed on Sep. 7, 2016 in Germany, the disclosure of which is incorporated herein by reference in its entirety.

The disclosure concerns a hydraulic unit for a slip controller of a hydraulic vehicle brake system.

BACKGROUND

Slip controllers are for example anti-lock brake systems, traction control systems and/or driving dynamics control systems/electronic stability programs, for which the abbreviations ABS, ASR, FDR/ESP are common. Such slip controllers of hydraulic vehicle brake systems of motor cars and motor cycles are known and are not described in detail here.

The core part of such slip controllers is a hydraulic unit comprising a hydraulic block that is populated with hydraulic components of the slip controller, that is connected to a master brake cylinder by brake lines and to which one or more hydraulic wheel brakes are connected via brake lines. Hydraulic components are inter alia solenoid valves, hydraulic pumps (mainly piston pumps), non-return valves, hydraulic reservoirs, damper chambers and pressure sensors. The hydraulic block is typically a cuboid metal block that is used for the mechanical attachment and hydraulic connection of the hydraulic components of the slip controller. Connection means the hydraulic connection of the hydraulic components according to a hydraulic circuit diagram of the slip controller.

The hydraulic block comprises receptacles for the hydraulic components of the slip controller. In this case, the receptacles are usually cylindrical, mainly stepped-diameter recesses, blind holes or through holes that are applied to the hydraulic block and in which the hydraulic components are fully or partly inserted, for example are pressed in. For example, hydraulic pumps are usually fully inserted into the receptacles thereof in a hydraulic block, whereas in the case of solenoid valves usually only a hydraulic part is inserted into a receptacle in a hydraulic block and an electromagnet for actuating the solenoid valve protrudes from the hydraulic block. By means of usually cartesian drilling of the hydraulic block, the receptacles are connected to each other according to the hydraulic circuit diagram of the slip controller. Cartesian means bores in the hydraulic block that are formed parallel or perpendicular to each other and to surfaces and edges of the hydraulic block. When populated with the hydraulic components, the hydraulic block forms a hydraulic unit.

For driving the hydraulic pumps, known hydraulic units comprise an electric motor that is externally attached to the hydraulic block on one side.

For connecting the hydraulic block to a master brake cylinder and for connecting wheel brakes to the hydraulic block, known hydraulic blocks comprise connecting bores for brake lines. The connecting bores are typically cylindrical recesses or blind holes, which for example comprise internal threads for a screw connection to a threaded nipple of a brake line or are unthreaded for pressing in a press-fit nipple of a brake line.

The patent application DE 10 2006 059 924 A1 discloses a hydraulic block for a hydraulic unit of a slip controller of a hydraulic vehicle brake system, in the case of which receptacles for solenoid valves of the slip controller are disposed in a cover side that can also be referred to as a valve side. Two receptacles for piston pumps as hydraulic pumps are formed mutually coaxially in longitudinal sides of the hydraulic block that adjoin the top side. An electric motor for driving the two piston pumps is centrally disposed externally on the known hydraulic block on a base side opposite the top side, and drives the pump pistons of the piston pumps with an eccentric element to perform an axial reciprocal stroke movement. The eccentric element is disposed in the hydraulic block in an eccentric space between the two piston pumps or the receptacles thereof.

SUMMARY

The hydraulic unit according to the disclosure is provided for a slip controller of a hydraulic vehicle brake system and comprises a hydraulic block with one (or a plurality of) hydraulic pump(s) and solenoid valves for the slip controller. Further hydraulic components of the slip controller, such as non-return valves, hydraulic reservoirs, damper chambers and pressure sensors, are preferably installed in the hydraulic block. For driving the hydraulic pump, the hydraulic unit comprises an electric motor that is disposed on one side of the hydraulic block. The solenoid valves are disposed on or in the hydraulic block on a different side from the electric motor, wherein electromagnets protrude fully or partly out of the hydraulic block. The solenoid valves are preferably disposed on a side of the hydraulic block that bounds on the side on which the electric motor is disposed. The disclosure does not exclude further solenoid valves on other sides.

For slip control, the hydraulic unit according to the disclosure comprises an electronic control unit that controls or regulates the solenoid valves and the electric motor as well as possibly further electrohydraulic components of the slip controller. The electronic control unit is disposed on a side of the electromagnets of the solenoid valves remote from the hydraulic block and comprises a rotation angle sensor for the electric motor. With the rotation angle sensor, an angular position of a rotor of the electric motor can be measured, and in particular the electric motor can be electronically commutated. The disclosure eliminates the need for the separate attachment and wiring of a rotation angle sensor.

The electric motor is preferably disposed on a narrow side of the hydraulic block and protrudes beyond the hydraulic block on the side on which the solenoid valves are disposed. In this case, the electric motor protrudes from the hydraulic block approximately as far as the electromagnets of the solenoid valves. As a result, the perimeter of the electric motor is disposed approximately in a plane with the electronic control unit, whereby the rotation angle sensor can be easily disposed close to the electric motor, wherein close means an arrangement in which the angular position of the motor of the electric motor can be measured.

BRIEF DESCRIPTION OF THE DRAWINGS

The disclosure is described in detail below using an exemplary embodiment represented in the FIGURE. The single FIGURE shows a section of a hydraulic unit according to the disclosure. The drawing is a simplified and schematic representation for the understanding and description of the disclosure.

DETAILED DESCRIPTION

The hydraulic unit 1 according to the disclosure that is represented in the FIGURE is provided for a slip controller of a hydraulic vehicle brake system that is not represented further. Slip controllers are for example anti-lock brake systems, traction control systems and/or driving dynamics control systems/electronic stability programs, for which the abbreviations ABS, ASR, FDR/ESP are common. Such slip controllers of hydraulic vehicle brake systems are known from motor cars and motor cycles and are not described in detail here.

The hydraulic unit 1 comprises a cuboid hydraulic block 2 of for example metal with receptacles for hydraulic components of the slip controller. Hydraulic components of the slip controller are for example solenoid valves, hydraulic pumps, non-return valves, hydraulic reservoirs, damper chambers and pressure sensors. The receptacles for the hydraulic components are in particular cylindrical and partly stepped-diameter recesses, blind holes and through holes in the hydraulic block, in which the hydraulic components are fully or partly accommodated. By drilling the hydraulic block 2, the hydraulic components can be connected to each other hydraulically, i.e. according to a hydraulic circuit diagram of the slip controller. For connecting to a master brake cylinder that is not represented and for connecting hydraulic wheel brakes that are not represented, the hydraulic block 2 comprises connecting bores that are not visible in the drawing. The connecting bores are unthreaded recesses for pressing in the press-in nipples of brake lines or comprise internal threads for screwing in the threaded nipples of brake lines.

The hydraulic block 2 comprises solenoid valves 3 of the slip controller on a base side and on an opposing top side. The base side and the top side are large and congruent sides of the cuboid hydraulic block 2. Electromagnets 4 of the solenoid valves 3 protrude from the base side and the top side of the hydraulic block 2. The electromagnets 4 are disposed in valve domes, which can be seen in the drawing and are provided with the reference number 4 of the electromagnets.

In two mutually opposite narrow sides, the hydraulic block 2 comprises two piston pumps as hydraulic pumps 5, which are disposed coaxially. Between the two hydraulic pumps 5 is disposed an eccentric element that is not shown in the drawing, that can be driven rotationally by an electric motor 6 and that drives pump pistons of the hydraulic pumps 5 in an axial reciprocal stroke motion when it is being driven rotationally. The electric motor 6 is disposed externally on a narrow side of the hydraulic block 2, which, as with the narrow sides with the hydraulic pumps 5, adjoins the base side and the top side of the hydraulic block 2 with the solenoid valves 3, wherein the narrow side with the electric motor 6 is disposed between the mutually opposite narrow sides with the hydraulic pumps 5.

The electromagnets 4 of the solenoid valves 3 are disposed in valve covers 7, which are attached to the base side and the top side of the hydraulic block 2. An electronic control unit 8 of the slip controller, comprising electronic components 9 as integrated circuits and thyristors on a circuit board 10, is disposed in one of the two covers 7. The electronic control unit 8 controls or regulates the hydraulic components of the slip controller, in particular the solenoid valves 3 and the electric motor 6 for driving the hydraulic pumps 5. The circuit board 10 is disposed parallel to the base side and to the top side of the hydraulic block 2 on a far side of the electromagnets 4 of the solenoid valves 3 relative to the hydraulic block 2, and protrudes beyond the side of the hydraulic block 2 on which the electric motor 6 is disposed. On a protruding part, the circuit board 10, which can be considered to be a component of the electronic control unit 8, comprises a rotation angle sensor 11, with which an angular position of a rotor of the electric motor 6 can be determined, which enables the electronic commutation of the electric motor 6. In the exemplary embodiment, the electric motor 6 is an electronically commutated d.c. motor, but this is not necessary for the disclosure. The electric motor 6 comprises a rotation angle encoder 12 that rotates with the rotor of the electric motor 6. Since the electric motor 6 protrudes to approximately the same extent beyond the base side and the top side of the hydraulic block 2 as the electromagnets 6 protrude from the base side and the top side, attachment of the rotation angle encoder 12 is possible so that when the electric motor 6 is rotating, the rotation angle encoder 12 moves past on a circular path so close to the rotation angle sensor 11 that measurement of the angular position of the rotor of the electric motor 6 is possible. As a result, the electronic commutation of the electric motor 6 is possible in a simple manner. The rotation angle encoder 12 can for example be a magnet or a peripherally toothed disk.

The electric motor 6 is contacted on the perimeter thereof by the electronic control unit 8, so that the motor can be controlled or regulated by the electronic control unit 8. In the exemplary embodiment, a contacting means 13 of the electric motor 6 is a plug contacting means with blade contacts protruding perpendicularly to the circuit board 10 of the electronic control unit 8 of the electric motor 6 that plug into slot contacts of the circuit board 10 or vice-versa. When mounting the valve cover 7 that contains the electronic control unit 8 over the electromagnets 4 in the hydraulic block 2, the blade contacts pass into the slot contacts, i.e. the contacting means 13 of the electric motor 6 is self-contacting by mounting the valve cover 7. The electromagnets 4 of the solenoid valves 3 can be self-contacting in the same way. The contacting 13 of the electric motor 6 and the electromagnets 4 of the solenoid valves 3 is not carried out through the hydraulic block 2, but directly and over a short distance on the perimeter of the electric motor 6 in the exemplary embodiment.

What is claimed is:

1. A hydraulic unit for a slip controller of a hydraulic vehicle brake system, comprising:
    a hydraulic block;
    a hydraulic pump positioned in the hydraulic block;
    an electric motor configured to drive the hydraulic pump and positioned on a first side of the hydraulic block;
    a plurality of solenoid valves for a slip controller positioned on a second side of the hydraulic block, each solenoid valve having a respective electromagnet that protrudes from the second side of the hydraulic block;
    an electronic control unit configured to regulate the plurality of solenoid valves and the electric motor, and including a rotation angle sensor configured to sense a rotation angle of the electric motor; and
    a further plurality of solenoid valves on a third side of the hydraulic block that is opposite the second side, wherein:
    the electronic control unit further includes a circuit board having control electronics, the circuit board being positioned beyond a side of the electromagnets that faces away from the second side of the hydraulic block;
    the circuit board intersects a first side plane defined by the first side of the hydraulic block in such a way that a portion of the circuit board protrudes beyond the first side plane; and the rotation angle sensor is positioned on the portion of the circuit board that protrudes beyond the first side plane.

2. The hydraulic unit of claim 1, wherein the first side of the hydraulic block adjoins the second side of the hydraulic block.

3. The hydraulic unit of claim 1, wherein:
the first side of the hydraulic block is narrow relative to at least one other side of the hydraulic block, and
the electric motor protrudes beyond the first side plane.

4. The hydraulic unit of claim 1, wherein the electric motor includes:
a rotor configured to rotate; and
a rotation angle encoder that is configured to move on a circular path located proximate to the rotation angle sensor as the rotor rotates.

5. The hydraulic unit of claim 1, further comprising:
a valve cover that covers the electromagnets of the plurality of solenoid valves, wherein the electronic control unit is disposed on the valve cover.

6. The hydraulic unit of claim 1, wherein the electric motor is an electronically commutated motor.

7. A hydraulic unit for a slip controller of a hydraulic vehicle brake system, comprising:
a hydraulic block;
a hydraulic pump positioned in the hydraulic block;
an electric motor configured to drive the hydraulic pump and positioned on a first side of the hydraulic block;
a plurality of solenoid valves for a slip controller positioned on a second side of the hydraulic block, each solenoid valve having a respective electromagnet that protrudes from the second side of the hydraulic block; and
an electronic control unit configured to regulate the plurality of solenoid valves and the electric motor, and including a rotation angle sensor configured to sense a rotation angle of the electric motor, wherein:
the electronic control unit further includes a circuit board having control electronics, the circuit board being positioned beyond a side of the electromagnets that faces away from the second side of the hydraulic block;
the circuit board intersects a first side plane defined by the first side of the hydraulic block in such a way that a portion of the circuit board protrudes beyond the first side plane;
the rotation angle sensor is positioned on the portion of the circuit board that protrudes beyond the first side plane; and
the electric motor and the electronic control unit are configured such that attachment of the electric motor and the electronic control unit to the hydraulic block automatically contacts the electronic control unit and the electric motor to one another.

8. The hydraulic unit of claim 7, wherein the electric motor has an outer circumferential perimeter, and the circuit board electrically contacts the motor at the outer circumferential perimeter of the electric motor.

* * * * *